United States Patent
Saeed

(10) Patent No.: US 10,852,039 B2
(45) Date of Patent: Dec. 1, 2020

(54) DIRECTIONAL SOLAR PANEL ASSEMBLY

(71) Applicant: Elemental Engineering AG, Baar (CH)

(72) Inventor: Osman Saeed, Stans (CH)

(73) Assignee: Elemental Engineering AG, Baar (CH)

( * ) Notice: Subject to any disclaimer, the term of this patent is extended or adjusted under 35 U.S.C. 154(b) by 0 days.

(21) Appl. No.: 16/342,113

(22) PCT Filed: Feb. 9, 2018

(86) PCT No.: PCT/EP2018/053366
§ 371 (c)(1),
(2) Date: Apr. 15, 2019

(87) PCT Pub. No.: WO2018/146288
PCT Pub. Date: Aug. 16, 2018

(65) Prior Publication Data
US 2019/0353405 A1  Nov. 21, 2019

(30) Foreign Application Priority Data
Feb. 9, 2017 (EP) .................................. 17155433

(51) Int. Cl.
*F24S 30/452* (2018.01)
*H02S 20/10* (2014.01)
(Continued)

(52) U.S. Cl.
CPC ............ *F24S 30/452* (2018.05); *A01G 9/243* (2013.01); *H02S 20/10* (2014.12); *H02S 20/32* (2014.12); *H02S 40/22* (2014.12)

(58) Field of Classification Search
CPC ....... H01L 31/00–078; Y02E 10/50–60; H02S 10/00–40; H02S 20/00–32;
(Continued)

(56) References Cited

U.S. PATENT DOCUMENTS

2012/0047824 A1  3/2012  Chang et al.
2014/0130843 A1  5/2014  Kostuk et al.
(Continued)

FOREIGN PATENT DOCUMENTS

CN          104663266 A   6/2015
DE   10 2013 002 825 A1   8/2014
(Continued)

OTHER PUBLICATIONS

International Preliminary Report on Patentability dated Aug. 13, 2019 in counterpart Application No. PCT/EP2018/053366.
(Continued)

*Primary Examiner* — Bach T Dinh
(74) *Attorney, Agent, or Firm* — Sughrue Mion, PLLC

(57) ABSTRACT

A solar panel assembly (10) having a stand (30), a solar panel platform (20, 120) and one or more directional mechanisms (40; 404, 414) connecting the stand (30) with the solar panel platform. One or more optical elements (50; 161, 162) are provided at all or portions of the edges (24) of the platform around the solar panel directing the light under the platform (20, 120) or towards its underside (22), and then to the ground (31) under or near the solar panel assembly. One or more of the optical elements (161, 162) are mounted on an inner side of a profile (160). The profile (160) is connected via a web (164) to the solar panel platform (120) and the web is connected with a drive within the platform. The connection of the web extends the profile from the platform creating a passage (124) between the profile and the platform.

14 Claims, 15 Drawing Sheets

(51) Int. Cl.
*H02S 40/22* (2014.01)
*H02S 20/32* (2014.01)
*A01G 9/24* (2006.01)

(58) Field of Classification Search
CPC ......... H02S 30/00–20; H02S 40/00–44; H02S 50/00–15; H02S 99/00; F24S 30/00–48; F24S 2030/10–19; F24S 23/00–82
USPC .................................................. 136/243–265
See application file for complete search history.

(56) References Cited

U.S. PATENT DOCUMENTS

2016/0262323 A1    9/2016  Iwai
2017/0133979 A1*   5/2017  Asbeck ................... H02S 20/30

FOREIGN PATENT DOCUMENTS

| EP | 2 476 305 A2 | 7/2012 |
| JP | 2015-204755 A | 11/2015 |
| KR | 10-2010-0130115 A | 12/2010 |
| WO | 2005/034610 A1 | 4/2005 |
| WO | 2005/034611 A1 | 4/2005 |
| WO | 2016/074342 A1 | 5/2016 |
| WO | WO2016/132384 * | 8/2016 |

OTHER PUBLICATIONS

International Search Report for PCT/EP2018/053366 dated May 4, 2018 (PCT/ISA/210).
Written Opinion for PCT/EP2018/053366 dated May 4, 2018 (PCT/ISA/237).

* cited by examiner

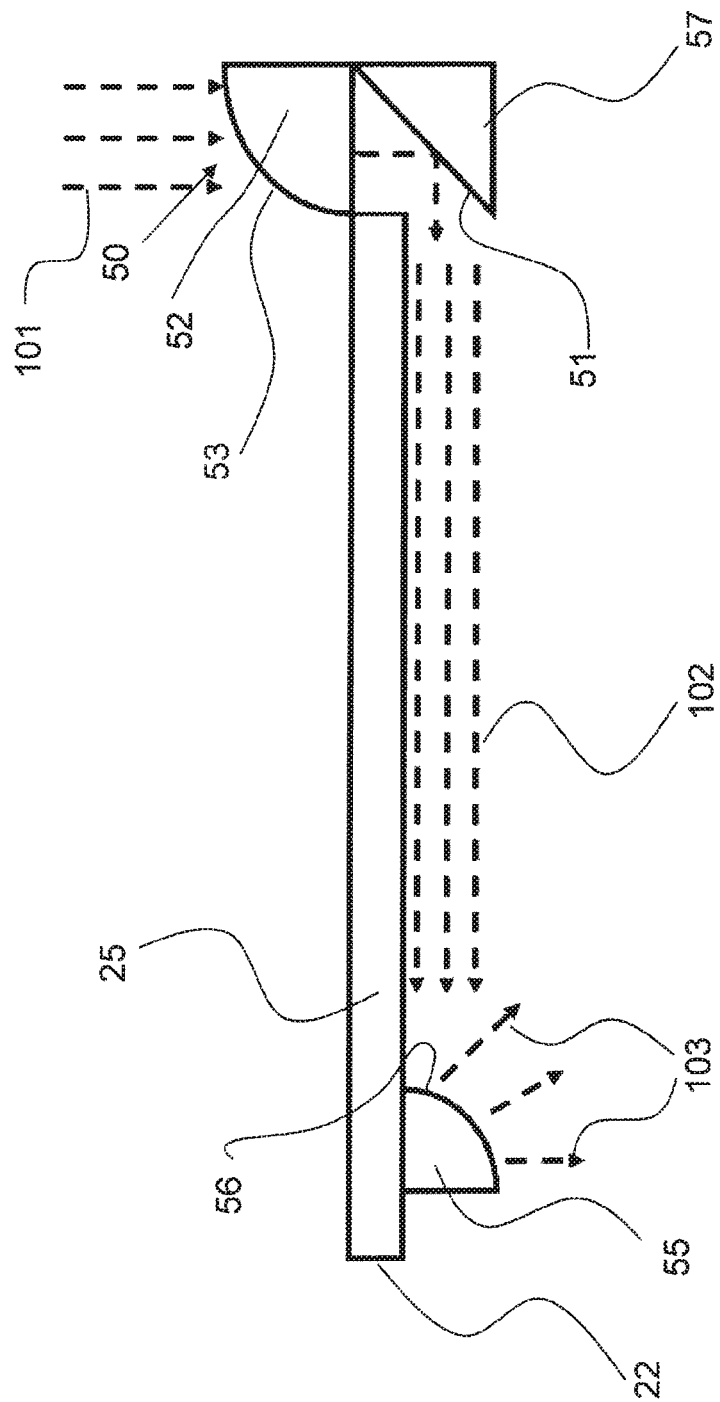

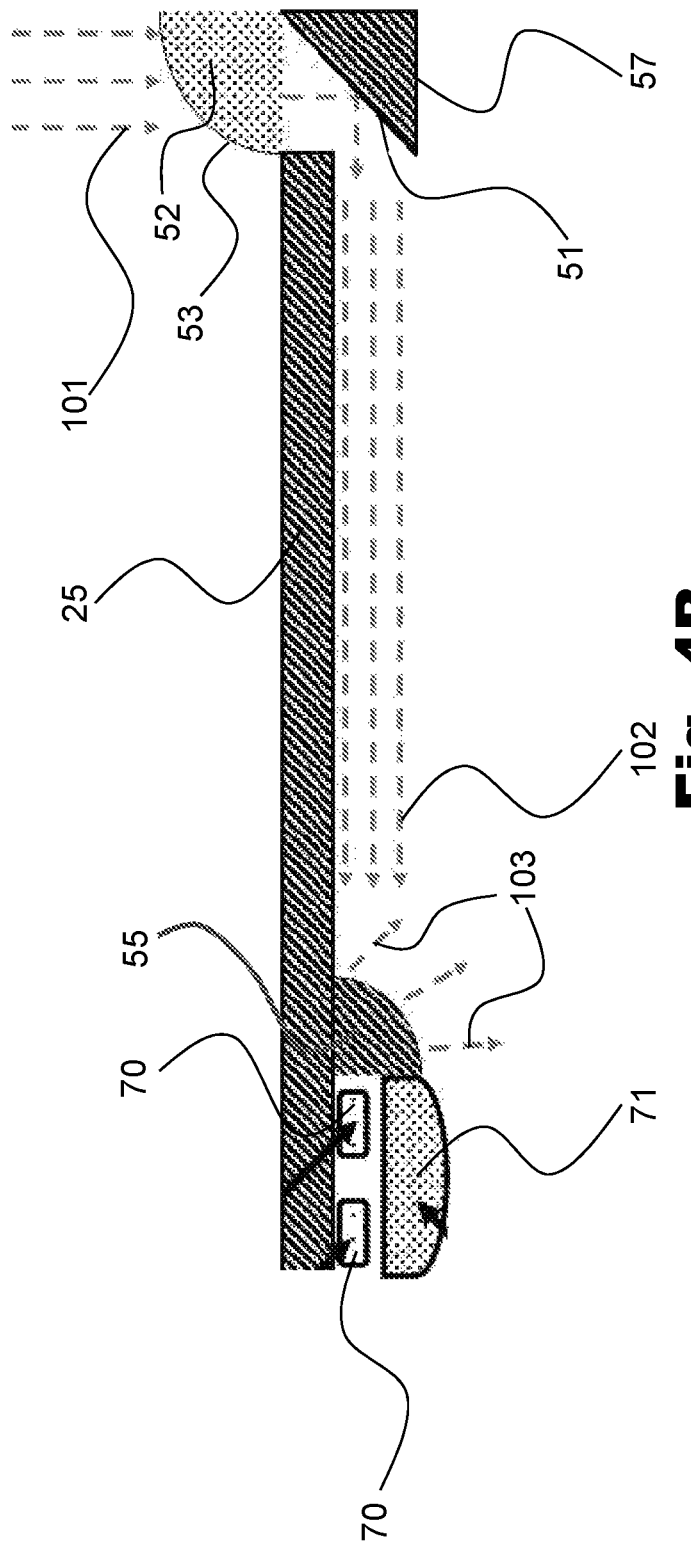

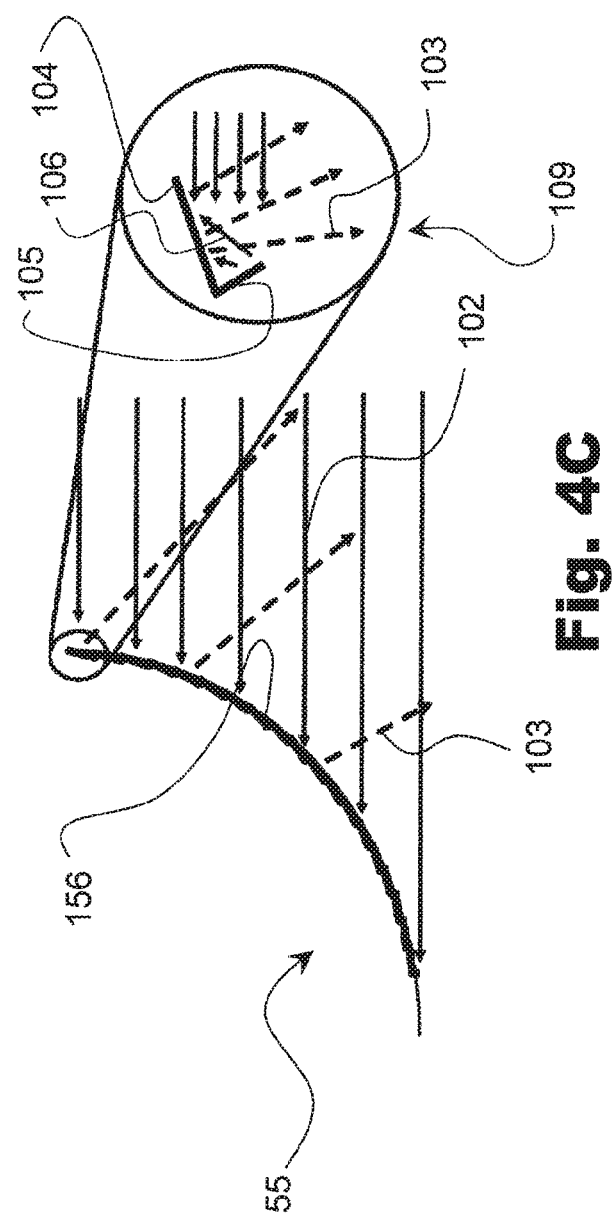

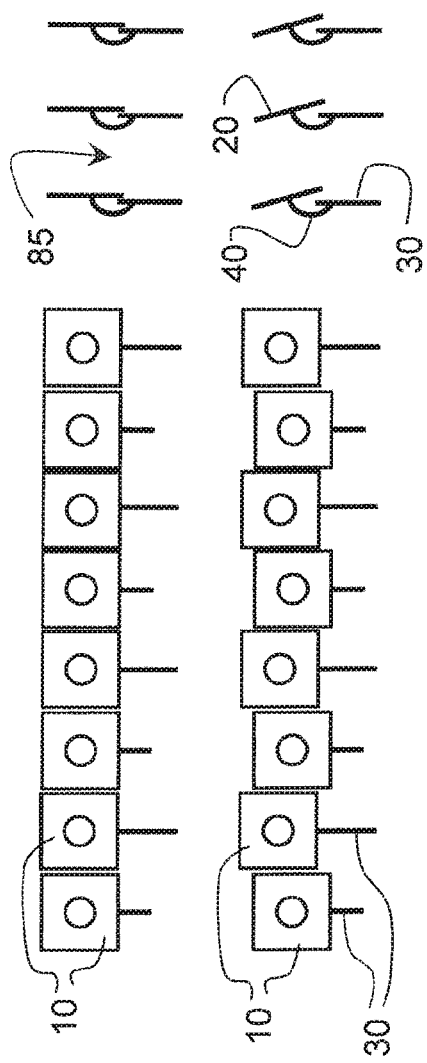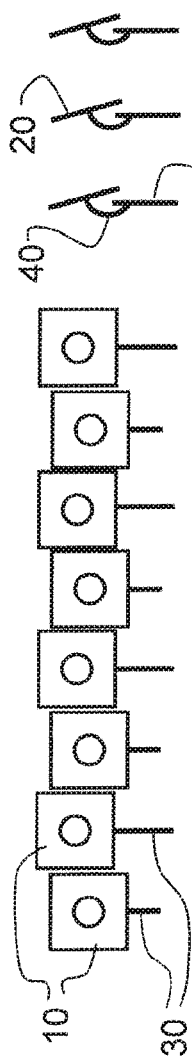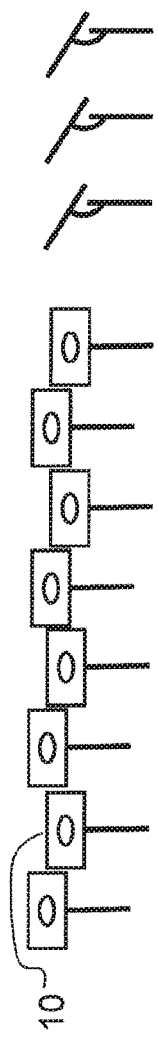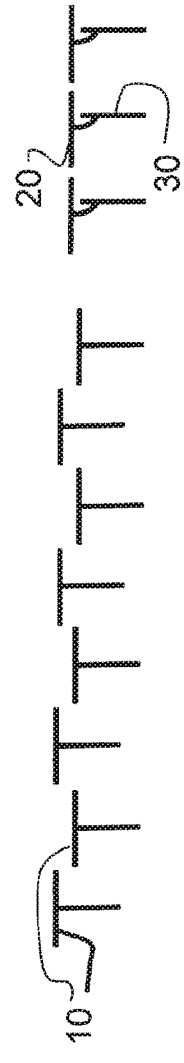
Fig. 6A
Fig. 6B
Fig. 6C
Fig. 6D

DIRECTIONAL SOLAR PANEL ASSEMBLY

CROSS REFERENCE TO RELATED APPLICATIONS

This application is a National Stage of International Application No. PCT/EP2018/053366 filed Feb. 9, 2018, claiming priority based on European Patent Application No. 17155433.0 filed Feb. 9, 2017, their entire contents of which are incorporated herein by reference.

TECHNICAL FIELD

The present invention relates to a directional solar panel assembly according to the preamble of claim 1.

PRIOR ART

WO 2016/074342 discloses a horizontal single-axis solar tracker support stand and a linkage system thereof, comprising a vertical column, a main beam that is rotatable and is provided on the vertical column, and a support frame fixed to the main beam and able to rotate with the main beam. The fixed support frame horizontally extends in a north-south orientation and is provided with a solar cell assembly arranged so as to form an inclined angle relative to a horizontal plane. When used in the northern hemisphere, the solar cell assembly is arranged at an inclined angle such that its northern side is higher than its southern side; the opposite angle of inclination is used in the southern hemisphere.

This type of installation aims at providing lines of solar cell assemblies being orientable in an efficient way following the sun. It solves a problem of providing a flat single-axis solar tracking structure which is not as easy to be damaged as an inclined single-axis structure and, at the same time, does not exhibit the problem of lower solar energy collection known from existing flat single-axis solar tracking structures.

Various directional means rotatable or tiltable to orient solar panels in an optimum position to gather the most sunlight possible over the day taking into account the path of the sun are known in the art. Usually, such solar panels are provided in arrays comprising a number of rows and columns, thus covering a substantive amount of land, especially useful agricultural areas. Even if said arrays are provided on roof surfaces of buildings, this usually makes these surfaces not usable otherwise. This is unfortunate, since it has been shown that green roofs have a positive impact on the service life of the roof of the building as well as on the environment of the urban district.

WO 2005/034611 discloses a harvesting module and system provided for maximizing agricultural land usage. Each module includes a water collection structure supported above agricultural land, and a water distribution subsystem for distributing collected water to plants and/or the soil. Specifically, the module further includes photovoltaic cells on said structure, and sun tracking systems may be incorporated in the module, so that the structure may be rotated to obtain maximum sun exposure. In particular, energy collected from the cells may be stored in a battery and be used to power lights, e.g. LEDs, to provide photonic energy, e.g. for photosynthesis, to the crops on the ground below the module.

DE 10 2013 002 825 also discloses an agricultural and photovoltaic installation having an integrated water supply. The installation comprises several poles horizontally spaced apart to form a pole array, each pole being adapted to support photovoltaic modules aligned on a substructure. The photovoltaic modules can be aligned to a respective position of the sun over two pivot axes. The integrated network-independent water supply includes a rainwater collection system and an irrigation system for the irrigation of agriculturally used ground, wherein one or more tanks serve as water reservoirs and collected water may also be used for cooling the photovoltaic modules.

KR 2010-0130115 discloses a rotatably supported solar cell panel formed by multiple solar cell modules installed on a support board. For dispersing sunlight to the plants shaded by the panel, through-holes are formed in the support board between rounded corners of adjacent solar cell modules, and light-transmitting elements are provided in this perforation. Furthermore, a lower irregular reflection flap is provided at the lower edge of the panel to reflect sunlight incident on the flap from above to a reflective underside of an adjacent panel to bring additional dispersed sunlight via these two reflections to the ground under the adjacent panel.

SUMMARY OF THE INVENTION

An objective of the present disclosure is to provide an improved directional solar panel assembly allowing the agricultural use of the ground area beneath it or avoiding the loss of vegetation beneath such solar panel structures. Furthermore, it is an aim of the invention to provide a solar panel assembly having simpler elements and being better adapted to withstand bad weather conditions, in particular strong winds. This is achieved by the solar panel assembly according to claim 1 and by an array of solar panel assemblies according to claim 10.

The solar panel assembly comprises a stand to be anchored on or in the ground, a solar panel (on a platform, thus also denoted as solar panel platform) oriented to the skies and one or more directional mechanisms connecting an upper free end of the stand with the solar panel, allowing the solar panel to be directed in a number of favorable orientations towards the sun.

According to the invention, said solar panel assembly is provided with optical light guiding or diverting elements (also simply denoted as optical elements herein) around the perimeter of the solar panel arranged to gather and guide incoming light towards an underside of the solar panel so as to be directed directly or indirectly towards the ground. The redirection at the edges can be provided by reflecting incoming light and directing the reflected beams to the ground, which can—in all embodiments—be the ground under the same solar panel assembly or near it, comprising ground areas under adjacent solar panel assemblies. Optical light guiding elements around the perimeter can be provided at all edges or only at parts of the edges of the solar panel platform.

One or more of such optical elements are mounted on the inner side of a profile, wherein the profile is connected via at least one web to the solar panel platform, preferably, via two connecting rods at the respective ends of the profile. The at least one web is connected with a drive mounted within the solar panel platform, wherein the connection of the at least one web is adapted to extend the profile from the solar panel platform creating a passage between the profile and the platform. The passage allows light to be collected and guided below the platform as well as collecting rainwater. In case of strong winds, the profile can be retracted towards the body of the platform not leaving the profile exposed to the winds.

The outer surface of the body of a platform substructure facing the inner surface of the profile is therefore preferably complementary to this inner surface so that the inner surface of the profile is mainly in direct two-dimensional contact with this outer surface when the profile is fully retracted, thus closing the above-mentioned passage used for collecting light and water completely in this case.

Preferably, an upper section of the profile is curved, especially enclosing or covering an angle of 60 to 90 degrees, with a complementary curvature being formed by the above-mentioned outer surface of the body of the substructure of the platform. The lower section of the profile can be a plane profile having an angle between 30 and 60 degrees to the plane of the upper platform surface, optionally having a raised gutter edge at the lower free edge of the profile. This allows an extended capture of sunlight which can be partly reflected directly towards the ground under the platform and partly directed to a central reflecting ridge of the above-mentioned platform substructure to be distributed indirectly towards the ground.

If, optionally, there are also optical elements integrated into an upper surface of the solar panel, it is preferred that these optical light guiding elements are provided on the solar panel base and together with a clear polymer substrate or glass panel, optionally covered by an oleophilic layer to provide molecular properties on the surface of the panel decreasing active particle engagement. Thereby, a smooth upper surface is provided, so that water pouring onto the surface can directly flow—in the case of an inclined solar panel—to the lower adjacent edges.

According to an embodiment, said solar panel assembly is provided with a plurality of LED's on the underside of the solar panel arranged to generate so-called grow light (also known as plant light) directed directly or indirectly towards the ground. The wavelength of the generated grow light can be predetermined according to the plants whose growth is to be promoted on the ground. It is suggested that at least a light level, given in Photosynthetic Photon Flux Density (PPFD), between 100 and 800 micromol/m$^2$s is provided. For a daylight-spectrum (5800 K) lamp, this would be equivalent to 5800 to 46,000 lumen/m$^2$. The LED's can be arranged in a predetermined pattern on or in the underside of the solar panel platform. They can comprise light guiding and focusing lenses to guide the emitted light of the plurality of LED's onto the ground taking into account that the light of each solar panel assembly combined with light emitted from adjacent solar panel assemblies should cover the entire ground under the solar panel assemblies. It is also possible to provide a central group of LED's under the solar panel platform, not necessarily but preferably in its center, wherein light reflecting elements are provided around these LED's to reflect light redirected from the edges of the platform, thus directing it to the ground and providing space for imaging lenses for the LED's. The predetermined pattern can simply comprise an arrangement of single or bundled LED's in a number of rows and columns.

Furthermore, it is preferred that at least one rainwater gutter is provided at or along one edge of the solar panel platform, with corresponding distribution elements. Such distribution elements can be a conduit running along the stand to distribute collected water around the stand. The rainwater gutter can be integrated into a light gathering structure as described above, provided at the perimeter of the solar panel. The preferred edge is the edge which stays low when the solar panel platform is positioned perpendicularly or at least at an angle close to 90 degrees to the axis of the incoming sunlight. It is possible to provide additional gutter elements on the edges adjacent to this lower edge so as to avoid a sideways spilling of rain water.

For an efficient use of ground areas covered by a plurality of solar panel assemblies according to the invention, it is possible to include a battery or a series of battery banks in every solar panel assembly creating a distributed system. It is also possible to provide electrical lines connecting the array of solar panel assemblies in between and with the external world. Since usually agricultural use is executed in lines, the electric lines can be positioned parallel to the agricultural plough lines.

An array of isolated solar panel assemblies can comprise wireless communication means. Then each solar panel assembly can be an access point of a distributed computer network, not needing further infrastructure.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments and not for the purpose of limiting the same. In the drawings.

FIG. 4A shows light paths in a detail view of FIG. 3 for an embodiment without light generating elements;

FIG. 4B shows light paths and light generating elements in a detail view of FIG. 3 for an embodiment comprising light generating elements;

FIG. 4C shows a schematical detail view of prismatic grated surfaces as reflecting surfaces as used in the embodiments of FIGS. 4A and 4B;

FIG. 6A shows a front view (left) and a side view (right) of an array of staggered solar panel assemblies;

FIG. 6B shows the front view and side view of the array of FIG. 6A with a small angle from the vertical orientation;

FIG. 6C shows the front view and side view of the array of FIG. 6A with a great angle from the vertical orientation;

FIG. 6D shows the front view and side view of the array of FIG. 6A with a horizontal orientation of all solar panel assemblies;

DESCRIPTION OF PREFERRED EMBODIMENTS

The following describes in detail embodiments of the present disclosure. Examples of the embodiments are shown in the accompanying drawings, where reference signs that are the same or similar represent same or similar components or components that have same or similar functions.

Figure 1:
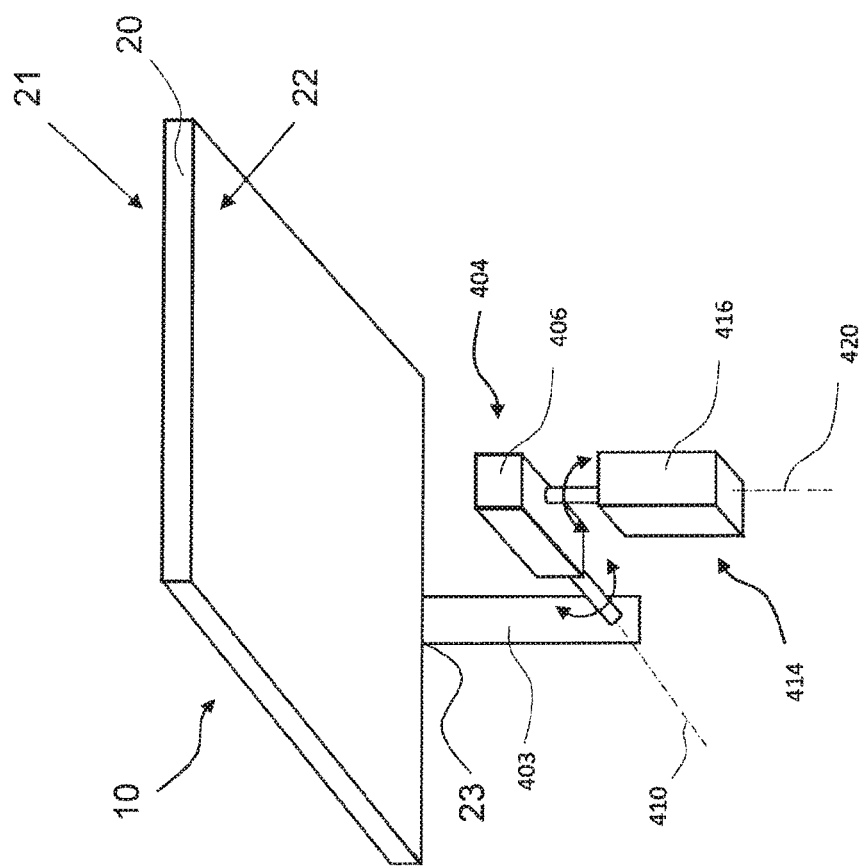
FIG. 1 shows a schematic perspective view from below of a mechanism for directing a solar panel according to an embodiment of the invention.

FIG. 1 is a schematic perspective view from below of a mechanism for directing a solar panel according to an embodiment of the invention. The solar panel assembly 10 comprises a platform 20. On the upper surface 21 of the platform 20, a photovoltaic, i.e. solar panel (not shown) as well as optional sensors of a tracking device are mounted. In an alternative embodiment, the platform 20 itself can comprise a solar cell module with a corresponding perimeter frame. In either case, the upper surface 21 of the platform 20 is to be oriented to the sky and provides the solar panel surface, whereas the underside 22 comprises one or more attachment points 23 for the adjustment, i.e. directional, mechanisms 404 and 414.

In a different embodiment (not shown in the drawings) the solar panel could comprise a passivated emitter rear contact solar cell, a so-called PERC cell, where the upper surface 21 would be the primary collector and the lower surface, i.e. underside 22 the secondary collector or any other collector whether dual faced or arranged back-to-back.

An arm 403 projects from the attachment point 23 and connects the platform 20 with a first mechanism 404 for adjusting the tilt of the platform 20, here illustrated as a first drive motor 406 actuatable to rotate the arm 403 and therefore the platform 20 around a horizontal axis 410. The platform 20 is further operably connected to a second mechanism 414 comprising a second drive motor 416 actuatable to rotate the first mechanism 404 and therefore the platform 20 about a vertical axis 420. The drive motor 416 of the embodiment of FIG. 1 is fixedly connected with a vertical stand 30 shown in FIG. 2, anchored firmly in the ground 31 below. Motors 406 and 416 are connected to a battery of the solar panel charged by the solar panel.

Figure 2:
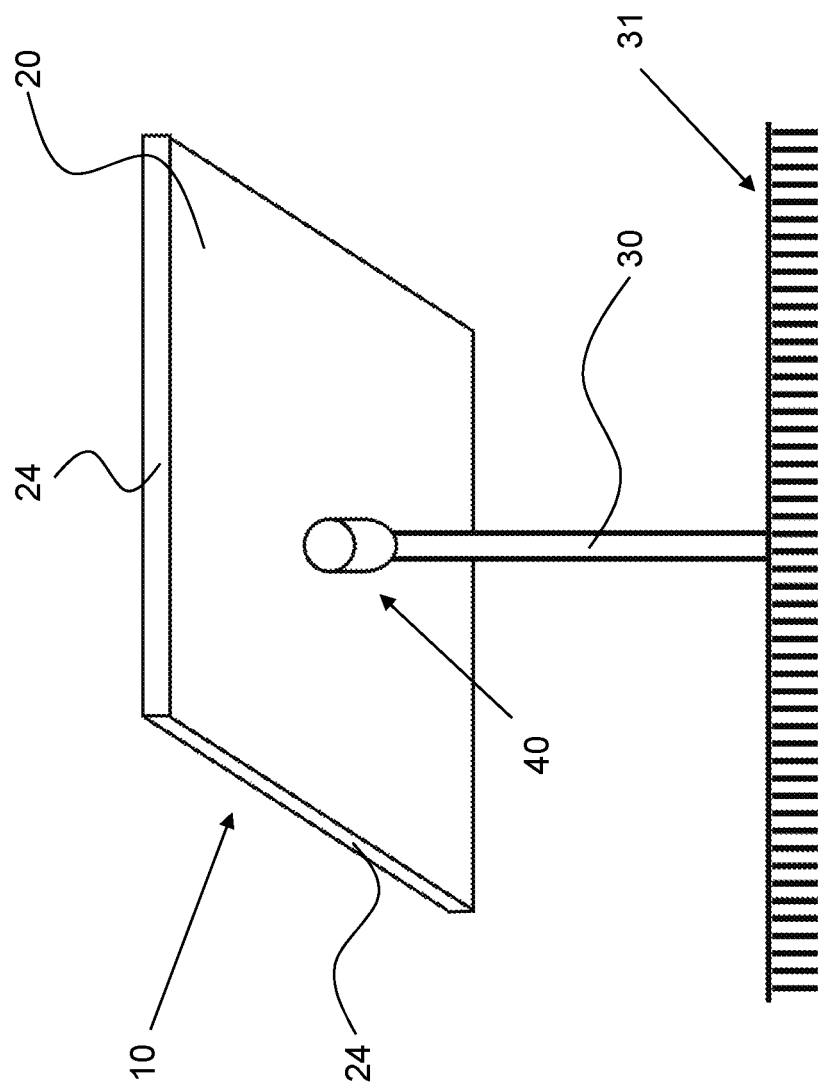
FIG. 2 shows a schematic perspective view from below of a further mechanism for directing a solar panel according to an embodiment.

FIG. 2 shows a schematic perspective view from below of a further mechanism for directing a solar panel according to an embodiment of the invention. The solar panel assembly 10 comprises a platform 20 which is centrally connected via a driven universal joint 40 to a stand 30, especially a cylindrical stand, being firmly anchored in the ground 31 below. Preferably, the length of the stand 30 is sufficient to allow persons to work unimpeded independent from the orientation of the platform 20; thus, the stand 30 usually has a length of more than 2 meter plus the half of the platform diameter, if the stand is attached centrally. The edges 24 of the platform 20 should not be tilted lower than said free user height. If, in the agricultural use, the ground 31 is intended to be worked, e.g. ploughed, with machines, then the height of these machines has to be taken into account in the free height to be predetermined. It is also possible to provide the panels at lower heights. Then, in case of service, the panels 10 would usually be folded to stand upright, thereby producing lowest energy levels, in order to render the ground below clear of obstacles for free height ploughing, sowing, fertilizing and generally working the land. Under such conditions, airplanes can be used and watering systems can be moved across the field.

Figure 3:
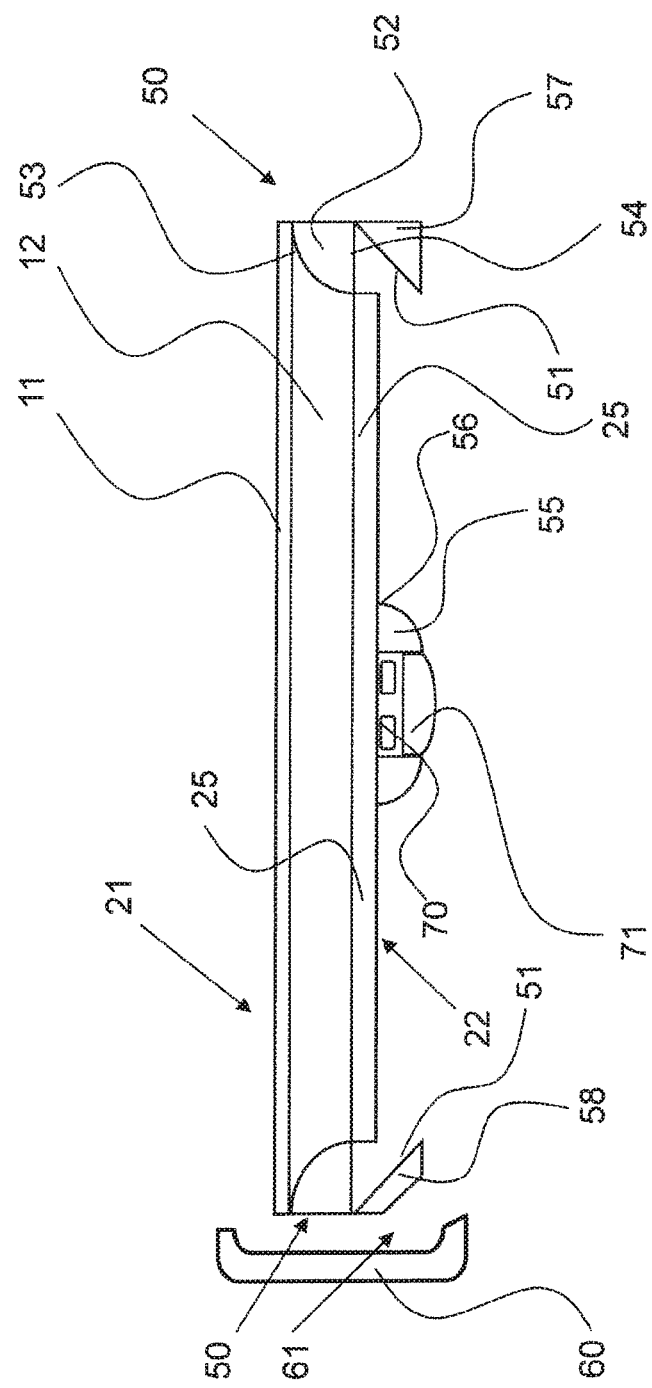
FIG. 3 shows a cross-section view of a solar panel platform of FIG. 1 or FIG. 2 with light diverting elements integrated in its upper surface and light generating elements at its underside according to an embodiment.

FIG. 3 shows a cross-section view of a solar panel platform 20 of FIG. 1 or FIG. 2 with optical light diverting elements 50 provided at the edges 24 of the solar panel platform 20 and integrated into its upper surface according to an optional specific embodiment. Exterior optical light diverting elements 161, 162 provided at inner sides of extendable profiles 160 according to the invention at the edges 24 are described with reference to FIGS. 8-13 further below.

The solar panel platform 20 comprises preferably an oleophilic layer 11 at its upper surface 21, whose function it is to provide molecular properties on the surface of the panel decreasing active particle engagement, i.e. dust, oil and water based particles glide off the surface without adhesion. A clear polymer substrate or glass panel 12 covers the solar panel 25 itself. Within this embodiment, the solar panel 25 provides as such the platform structure, but it could also be included in a frame connecting the optical elements 50 at the edges 24 together and/or an optical element 55 at the centre. The clear polymer or glass 12 comprises at the edges 24 a recess filled completely by the light gathering lenses 52 being long profiles with the cross-section as shown in FIG. 3. The two cover layers 11 and 12 are transparent.

The first light diverting elements 50 are provided preferably essentially along the entire respective edge 24 of the platform 20 on the left and on the right side of the cross-section view of FIG. 3. They comprise each a reflecting surface 51 provided at an angle of between 30 and 60 degrees, e.g. 45 degrees in the embodiment of FIG. 3, against the upper surface plane of the platform 20. On the right side of the cross-section view of FIG. 3, the reflecting surface 51 is formed by a triangular reflecting profile 57 provided to deflect incoming light passing the exterior of panel 25 at the edge 24 towards the centre. The transparent light gathering lens 52 integrated in the cover layers 11 and 12 is provided directly above the reflecting surface 51. It comprises an arcuate upper entry surface 53 and a lower outgoing surface 54 parallel to the upper surface plane of the platform 20. As shown in FIG. 3, the arcuate upper entry surface 53 forms right angles both with the vertical edge 24 of the platform 20 and with the horizontal lower outgoing surface 54. These measurements are mentioned as basic reference for a tested embodiment, although other measurements may also be applied depending on the incarnation of the panel being manufactured. However, the width and height of these light gathering structures around the edge 24 of the solar panel will usually be chosen to be between 0.5% and 10%, preferably 1% to 5% of the lateral dimensions of the solar panel or its frame itself.

Most of the gathered light leaving the light diverting element 50 through the surface 54 is directed onto the reflecting light diverting element 55 provided near the center of the underside 22 of the platform 20. The light reflected by its reflecting surface 56 is directed to the ground. In this context "center of the underside" 22 can either mean a central part with e.g. two times two LED's (as light generating elements, i.e. light sources) 70 and a torus-like reflecting element 55, or the light gathering elements 57 and 58 are only provided at opposite edges of the platform and redirect the light in parallel beams 102 (cf. FIG. 4A, 4B) towards two opposite central longitudinal reflecting surfaces 56 with a single of double band of light LED 70 in between.

On the left side of FIG. 3, the triangular element 57 with the reflecting surface 51 is replaced by a trapezoid element 58 with a similar front reflecting surface 51. A gutter wall 60 is provided in a predetermined distance behind the optical element 50 at the edge 24 and behind the trapezoid profile 58. This creates a conduit line 61 or cavity section collecting any humidity arriving on the oleophilic surface 11 and thus guided to its borders. The gutter wall 60 has the form of a "C" encompassing the entire sandwich of the platform between upper surface 21 and lower surface 22 providing an upper border edge and a lower border edge, wherein the trapezoid element 58 provides more space for the conduit line 61 for a greater water flow passage. The gutter is of course fastened to the solar panel platform 20 or the frame encompassing the solar panel.

It is also possible to change the reflecting angle of the reflecting surface 51 for a direct illumination of the ground 31 shadowed by the platform. When the platform 20 is tilted and turned, the beam path between the element 50 and 55 remains the same, but the plane of the platform in view of the ground changes and the light will be directed partly underneath of one of the eight nearby adjacent solar assemblies. It is possible that an array of platforms is acceded or staggered rather than being regularly arranged with one assembly simply behind the other.

FIG. 4A shows light paths in a detail view of FIG. 3 for an embodiment without light generating elements 70 and without the transparent cover layers 11 and 12. Incoming light beam 101 traverses the light gathering lens 52 of the optical elements 50 at the edge and is reflected at the reflecting surface 51 essentially in parallel to the lower surface 22 as reflected beam 102.

According to the embodiment of FIG. 4B, the solar panel assembly 10 is provided with a plurality of LED's 70 on the underside of the solar panel arranged to generate so-called grow light being directed directly or indirectly towards the ground. The LED's are preferably attached from the underside of the platform 20 at its lower surface 22 and are connected to a control unit either provided in the platform 20 or in the stand 30, wherein any electrical connections are provided in or at the platform 20 (not shown).

The reflected beam 102 is reflected again at the reflecting surface 56 (cf. FIG. 3) of the central element 55, with resulting light beams 103 being directed to the ground. It is noted that central element 55 is attached at the underside 22 of the solar panel 25 or at a corresponding frame element (not shown).

The LED's 70 receive the necessary energy from the solar panel and/or a battery or a battery pack which is charged by the solar panel. The battery is preferably provided in the stand 30. The control unit predetermines via sensing elements that measure light frequency and intensity the grow light control in hours and intensity. Additionally, the present embodiment can provide an efficient energy use in choosing an LED illumination of the ground 31 emitting only in a bandwidth selection based on the needs of the plants, whereas the incoming light of the sun covers a broader bandwidth, thus increasing the light use efficiency. The embodiment of FIG. 4B provides an array of e.g. four LEDs 70 surrounded by a curved optical element 55 or several straight sections attached at the underside 22 or a corresponding frame (not shown). Within this frame of curved optical elements 55 a light-diffracting lens 71 is provided below the LEDs 70.

FIG. 4C shows a schematical detail view of prismatic grated surfaces 156 as reflecting surfaces as used with reference numerals 51 and 56 in the embodiments of FIGS. 4A and 4B; FIG. 4C shows the reflecting body 55 near the centre of the panel backside with a curved prismatic grated surface 156, but the principle also applies for the essentially plane surface 51. Incoming light beams 102 are reflected as reflected light beams 103. Detail view 109 of FIG. 4C shows a reflective element having a main reflective surface 104 and an acute angle reflective surface 105 partially reflecting light as intermediate light beam 106 to the primary reflective surface 104. In other words, FIG. 4C shows the prismatic grated surface 156 that passes light through a prismatic effect thereby bending and multiplying output light on the rear of the solar panel platform 20. A prismatic micrograting can be used, but the efficiency output is higher when using a nano-grated surface. It is noted that one edge is not perpendicular to the other and is usually less than 90° in order to generate the multiplier effect.

Figure 5A:
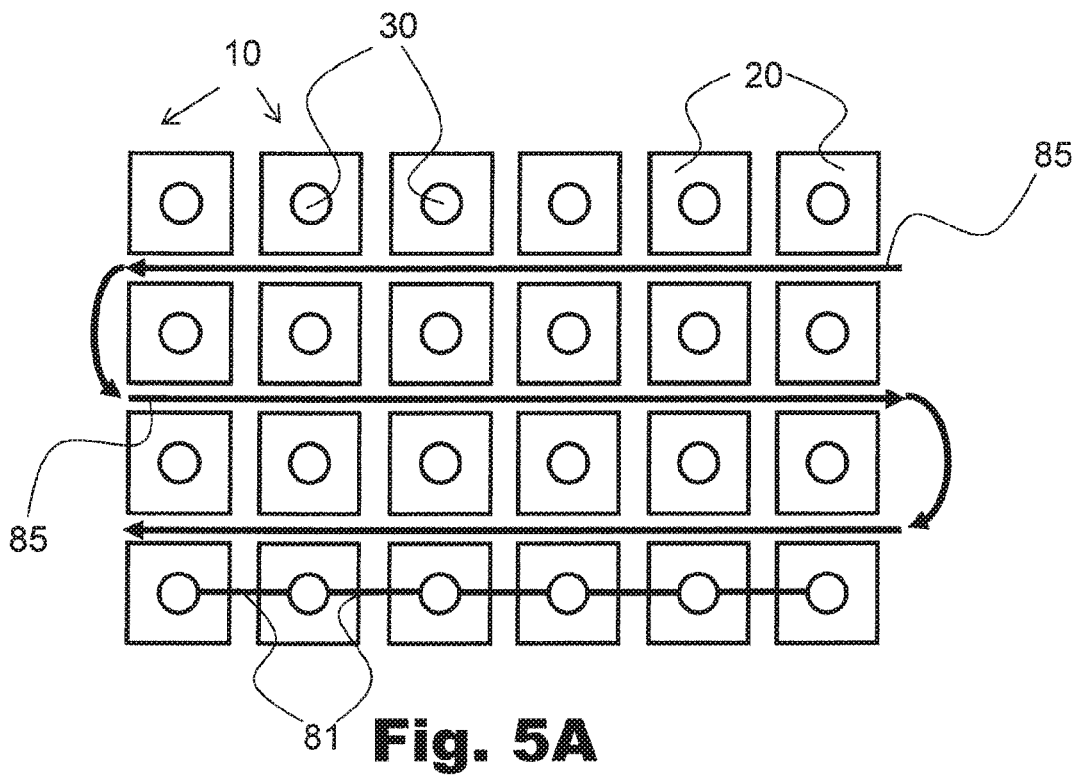
FIG. 5A shows a schematical view from above on an array of solar panel assemblies according to FIG. 2 according to an embodiment.
Figure 5B:
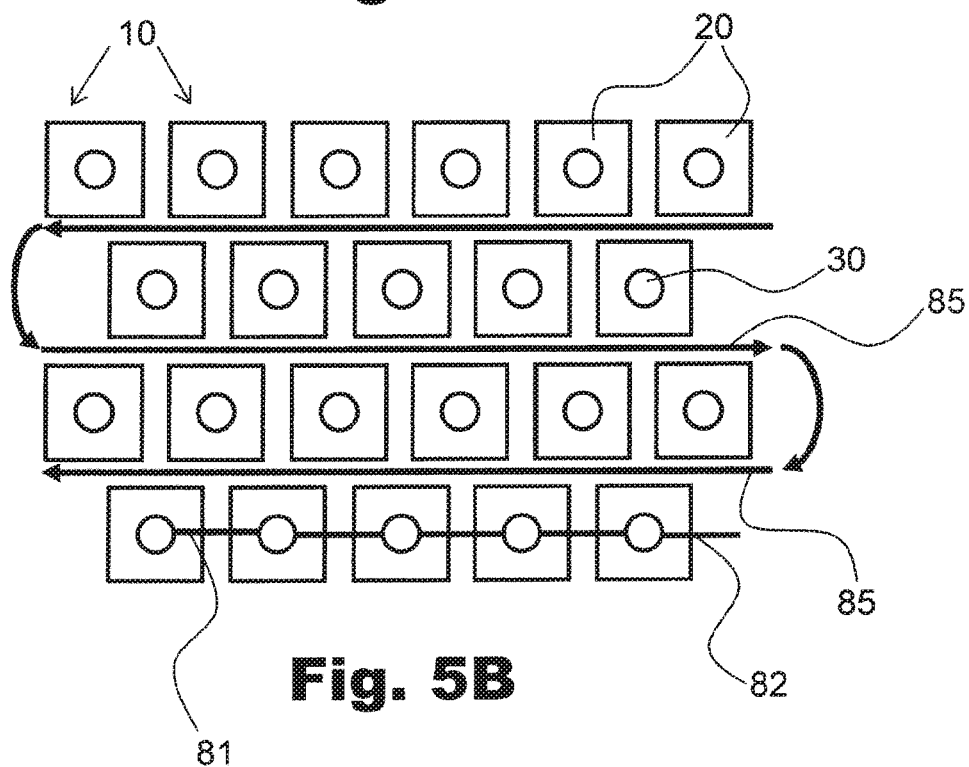
FIG. 5B shows a schematical view from above on an array of solar panel assemblies according to FIG. 2 according to a further embodiment having a staggered pattern of solar panel assemblies.

FIG. 5A shows a schematical view from above on an array of solar panel assemblies 10 according to FIG. 2 according to an embodiment of the invention. The solar panel assemblies are shown in a schematical manner with a representation of the stand 30 and the platform 20 for each assembly 10. The platforms 20 are represented in a horizontal configuration with approximately square surfaces, although the current panel industry mainly provides rectangular platforms 10 due to the nature of PV panel arrangements. The opposing edges 24 of solar panel assemblies 10 of adjacent rows and columns are provided at a minimum distance one from another. Said minimum distance is reached in the horizontal orientation of the platforms as shown in FIG. 5A. In any inclined configuration the distance between such opposing edges is higher than in the configuration shown in FIG. 5A. It is preferred that said distance is less than 80% of the widths of the solar panel assemblies 10 creating agricultural pathways 85 in between the rows of stands 30 under the solar panel platforms 20. With solar panels of e.g. 2 metres side length on platforms of e.g. 2 metres×2 metres such a distance can be 160 centimetres. In other words, each stand 30 has a distance from center to center in each row and each column of 3.60 metres. A distance of approximately 2*(SQR(2)−1) allows to incline the platforms 20 to about 45 degrees without shadowing neighboring solar panels. It is also possible to take a smaller minimum distance of opposing edges 24 of solar panel assemblies 10 of adjacent rows; e.g. as a percentage of the width of the adjacent solar panel assemblies 10 taken from the group of values 60%, 40%, 20%, 10% and 5% with increasing shadowing of neighboring solar panels. The above-determined distance between rows can also be applied to the distance of neighboring columns of the array.

For an efficient use of such ground areas covered by a plurality of solar panel assemblies 10, it is possible to include a battery in every solar panel assembly creating a distributed system. On the other hand, it is possible to provide electrical lines 81 connecting the array of solar panel assemblies in between and with an external connection 82 with the external world. These lines 81 and 82 usually comprise an electric connection for battery management and for data exchange between different array elements. Since usually agricultural use is executed in lines as shown by the two parallel lines 85, the electric lines 81 and 82 can be positioned parallel to the agricultural plough lines 85. Water distribution lines extend from the stands 30 to distribute gathered water over the entire surface.

An array of isolated solar panel assemblies 10 can comprise wireless communication means. Then each solar panel assembly 10 can be an access point of a distributed computer network, not needing further infrastructure.

FIG. 6A shows an array comprising numerous solar panel assemblies 10 organized in a staggered pattern from the front (on the left) as well as three consecutive rows from the side (on the right). In the orientation shown in FIG. 6A, the solar panels are oriented for ultra-low horizon plane at dawn, dusk and/or maintenance, harvesting, etc. when they are producing the lowest energy yield. Between two solar panel assemblies 10 of FIG. 6A, shown as "adjacent" in a front view, there is an empty row with a solar panel in the row behind. This is shown with different lengths of respective supports 30. In the side view on the right, the agricultural line 85 between two solar panels is clearly visible.

FIG. 6B shows the array of FIG. 6A in operation when the solar panel platforms 20 change their angle to follow the sun as it rises and/or sets over the horizon. FIG. 6C shows the same array being positioned at an alternate angle. FIG. 6D shows a typical midday sun angle as well as operational standby mode. The main reason for this angle for standby mode is to optimize light detection as stated.

Figure 7A:
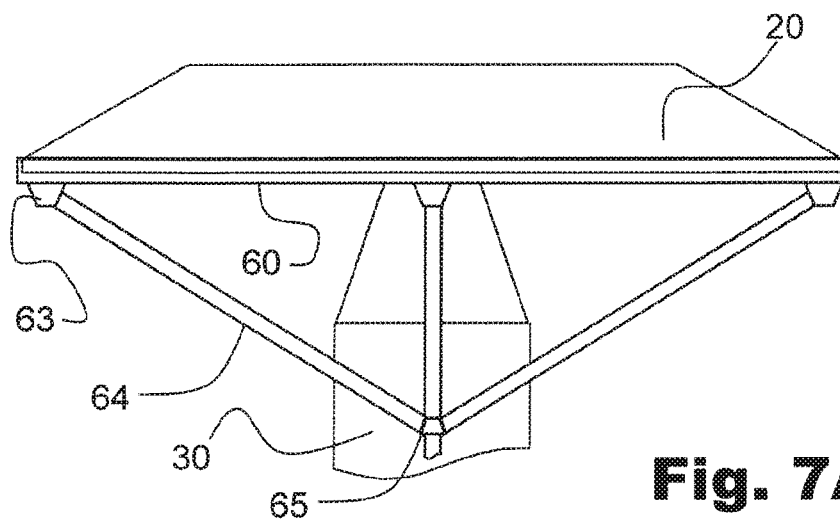
FIG. 7A shows a frontal diagram of a gutter arrangement with three flexible drain pipes.
Figure 7B:
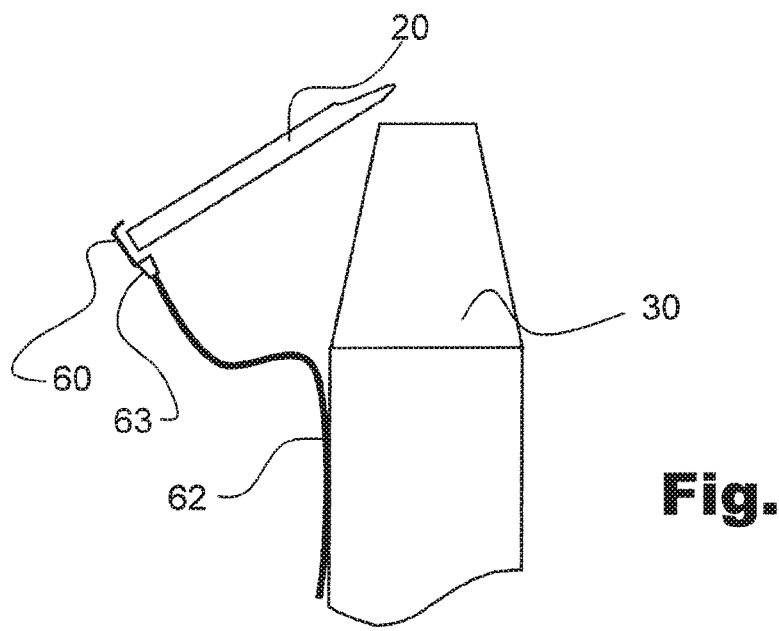
FIG. 7B shows a partial side view of a further gutter arrangement similar to FIG. 7A.

FIG. 7A shows a frontal diagram of a gutter arrangement with distribution elements in the form of three flexible drain pipes as upper lines 64 which are connected at a junction piece 65 to continue as a line 62 (FIG. 7B). It is also possible to only provide one of these pipes 64. There is a possibility to provide two, three, four or even more conduit pipes 62 that lead water away from the gutter 60 to ensure a smooth flow without overflow and/or as redundancies used in case of blockage.

FIG. 7B shows a schematic side profile of a gutter arrangement similar to that of FIG. 7A. The attachment of the solar panel platform 20 to the stand is not shown. In this embodiment, the flexible pipe 62 is leading down the stand 30. A marginal kink in the pipe 62 is shown in the drawing to demonstrate the slack in order to facilitate the varying angles of tilt that the solar panel 20 may have during operational periods as shown in FIG. 6A to 6D.

Figure 8:
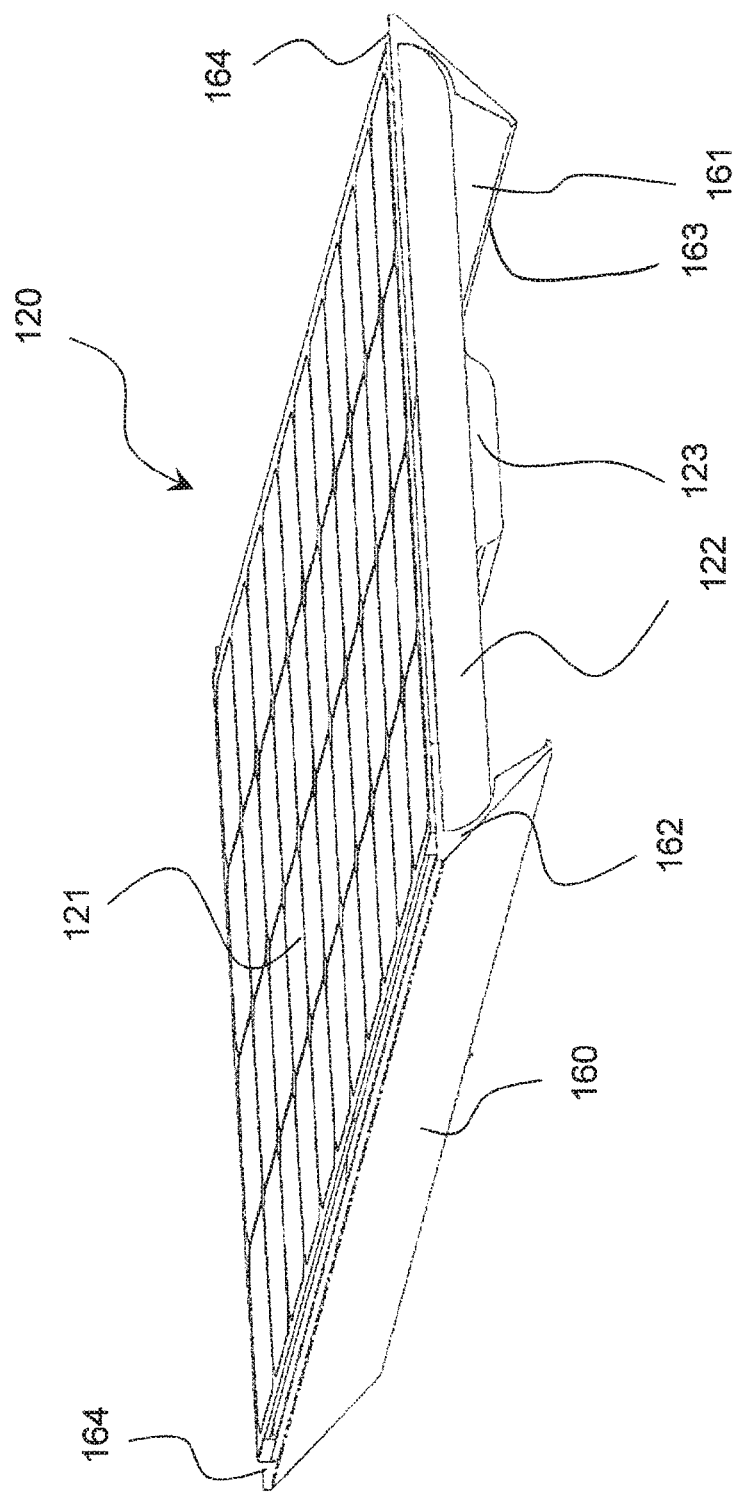
FIG. 8 shows a schematic perspective view of a solar panel platform in a retracted position according to an embodiment of the invention with two profiles extendable from two opposite edges of the platform.
Figure 9:
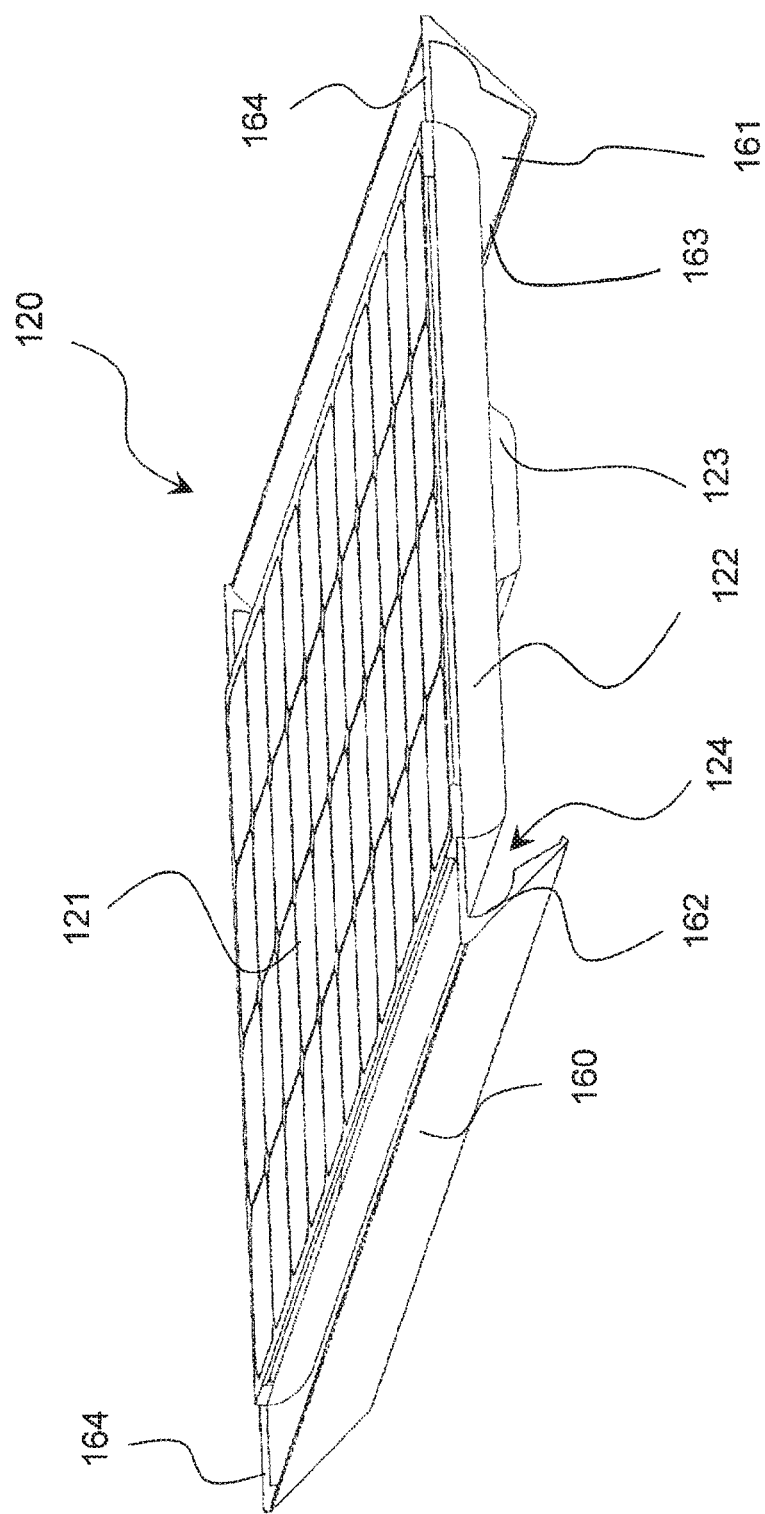
FIG. 9 shows a schematic perspective view of the solar panel platform of FIG. 8 in an extended position.
Figure 10:
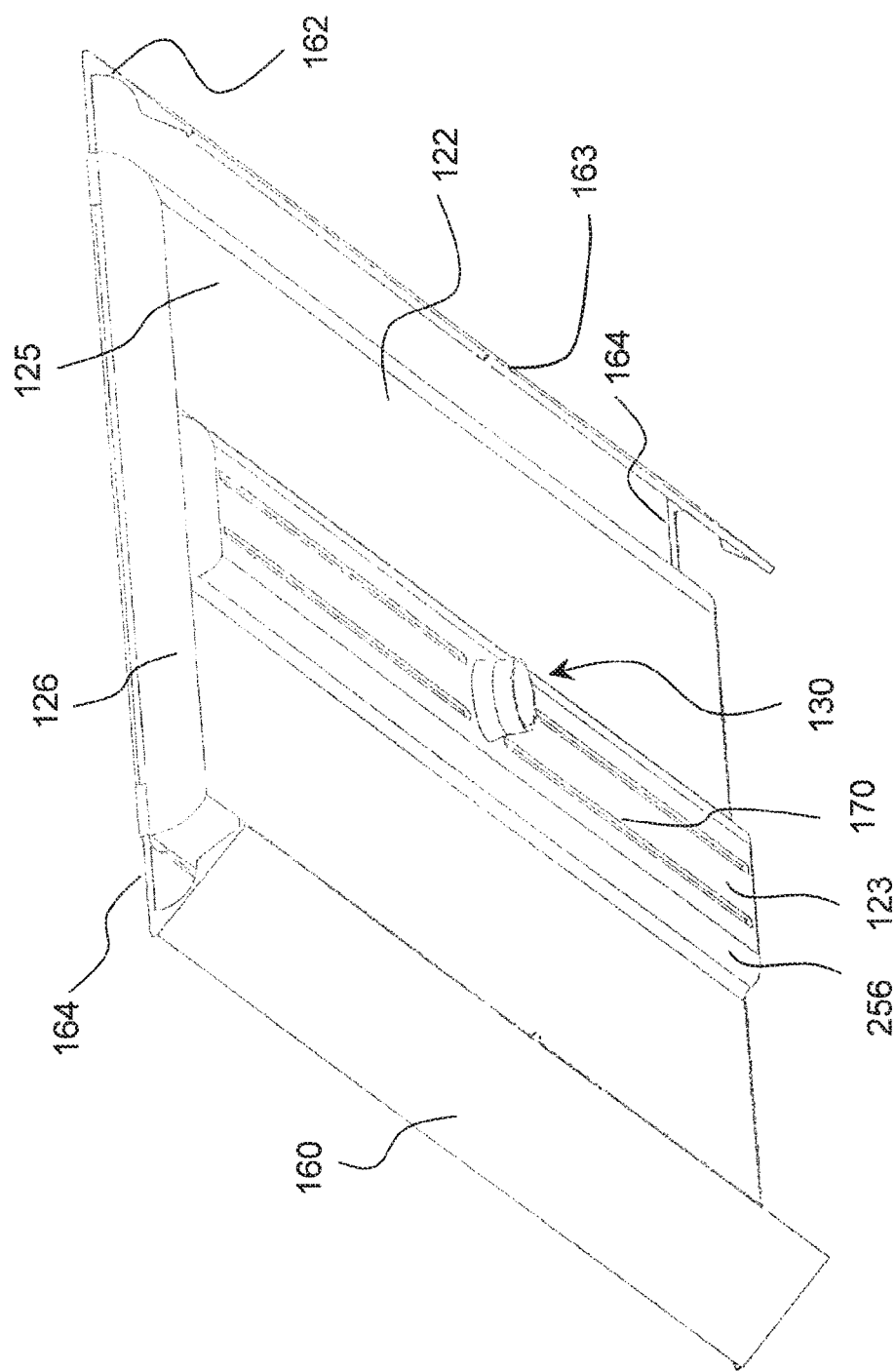
FIG. 10 shows a schematic perspective view from below on the solar panel platform of FIG. 9 in its extended position.

FIGS. 8-10 schematically show perspective views of a solar panel platform 120 according to an embodiment where two opposite sides, i.e. edges, of solar panel platform 120 are provided each with a profile 160 which is extendable and retractable with respect to platform 120 and has optical elements 161 and 162 mounted on its inner side facing the platform. A solar panel 121 is mounted on a platform substructure 122 having a central functional ridge 123. The functional ridge 123 as a central node can, for instance, be attached to a stand 30 as shown in FIG. 2. FIG. 8 shows solar panel platform 120 in a retracted position from above, FIG. 9 shows it in an extended position from above, and FIG. 10 in an extended position from below. Selected portions of platform 120 according to FIG. 8-10 are shown in more detail in FIGS. 11-13.

In the specific example shown in the Figures, the profiles 160 are designed as gutter and reflective profiles 160 provided on two opposite sides of platform 120, especially sides which can be tilted towards the ground. Each gutter and reflective profile 160 comprises a lower plane profile section 161, which can be reflective on the inner side, and an upper curved section 162. The upper curved section 162 is complementary to the adjacent outer surface of substructure 122 in order to provide almost no cavity and slot between the upper curved section 162 and the substructure 122 in the retracted position of platform 120. A lower edge 163 of the lower plane profile section 161 is raised over the plane surface and can retain water from directly falling down to the ground and, thus, be used as gutter. It is noted that the profile 160 is attached to the substructure 122 by two rods 164 fixedly connected at both ends of the profile 160. Both surfaces 161 and 162 can be provided with the structure as shown in FIG. 4C, having a plurality of prismatic grated surfaces 156 as reflecting surfaces.

The curved surface of the upper curved section 162 can cover an angle of 60 to 90 degrees, wherein the plane profile 161 can have an angle between 30 and 60 degrees to the plane of the upper platform surface.

The rods 164 are slidably integrated into the substructure 122. One or more drives (not shown) are connected to the rods, e.g. being a worm at an inner end, to push them out of the substructure 122 to extend the gutter and reflective profile 160 to provide a space between the upper curved section 162 and the substructure 122. The function will be described in connection with the further drawings. When strong winds are blowing, then the drives are activated to bring the gutter and reflective profile 160 close to the substructure 122, thus preventing the wind forces from attacking the solar panel platform in its extended position.

FIG. 9 shows a schematic perspective view of the solar panel platform 120 of FIG. 8 in an extended position. The main difference from FIG. 8 is the passage 124 provided between the gutter and reflective profile 160 and the substructure 122 by the extended position of the rods 164.

FIG. 10 shows a schematic perspective view from below on the solar panel platform 120 of FIG. 9 in its extended position. The substructure 122 comprises in parallel to the gutter and reflective profile 160 a functional ridge 123 extending beyond the lower surface 125 of the substructure 122. It comprises on its lower side two stripes of light sources 170, configured as LED lights, going from one edge 126 of the substructure 122 to an opening 130 in the middle and then prolongated to the opposite edge. Of course, there can be a number of single LED lights or there can be more than two lines of LED stripes 170. The stripes are provided on a flat lower surface of functional ridge 123, which can also be convexly curved. The border surface 256 of functional ridge 123 is curved—in cross section—in a quarter spherical shape and is reflective. Therefore, the surface 256 has the same function as the reflecting surface 56 of FIG. 4, whereas the lower plane profile 161 has the function of the reflecting surface 51.

Figure 11:
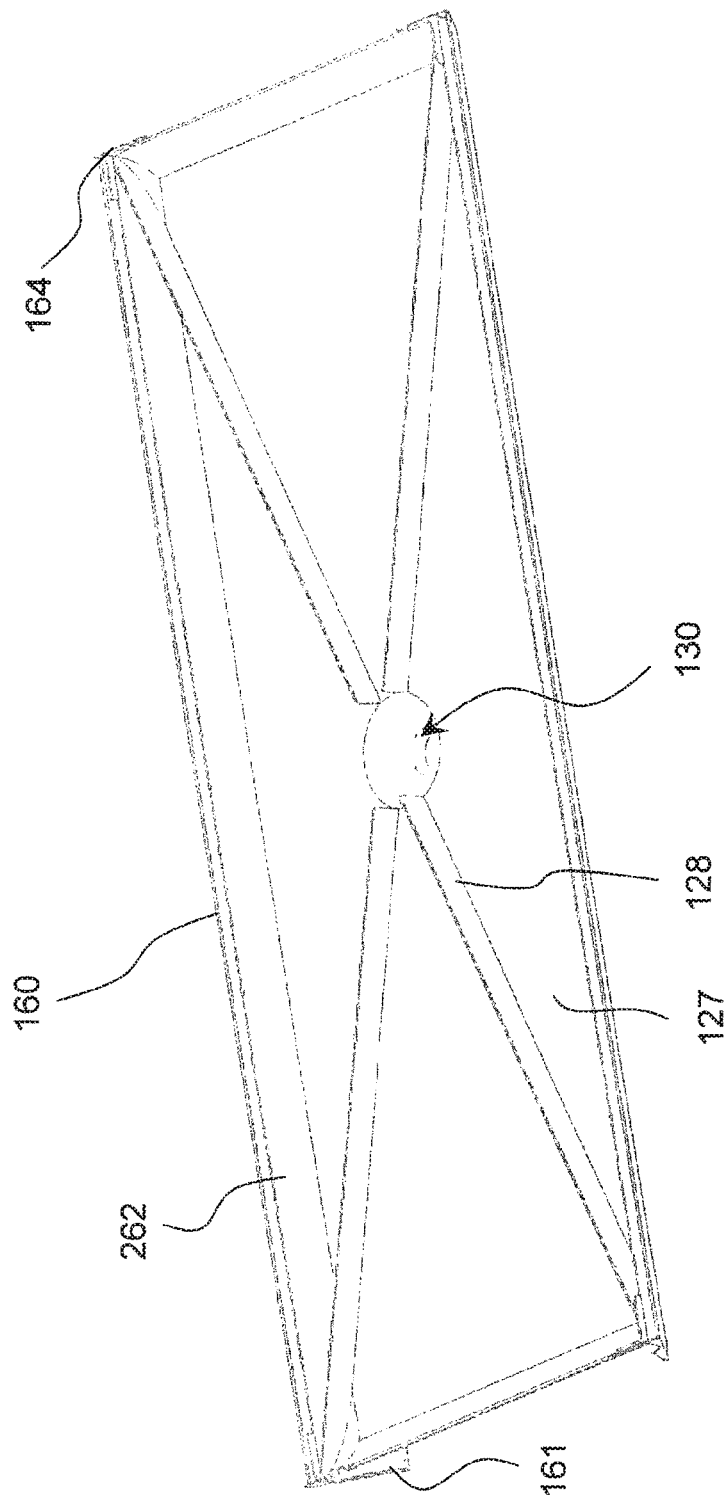
FIG. 11 shows a perspective view from above on the substructure of the solar panel platform of FIG. 10 without the solar panel mounted on it.

FIG. 11 shows a perspective view from above on the substructure 122 of FIG. 10 without the solar panel 121 mounted on it. Drives for rods 164 and electrical connections etc. are omitted, too. The substructure 122 has the shape of a tray with an essentially flat bottom surface 127. There are provided four reinforcing webs 128 reaching from the corners of the substructure 122 towards the center, where the opening 130 is provided. It is possible to provide a plurality of photovoltaic cell modules on the substructure 122 with spaces between them to gather rain water on the surface 127 of the tray.

The inner upper section (cf. its outer surface 262 shown in FIGS. 12-13) of the substructure 122 on the sides where the gutter and reflective profiles 160 are provided is shown as a hollow complementary section to the upper curved profile section 162.

Figure 12:
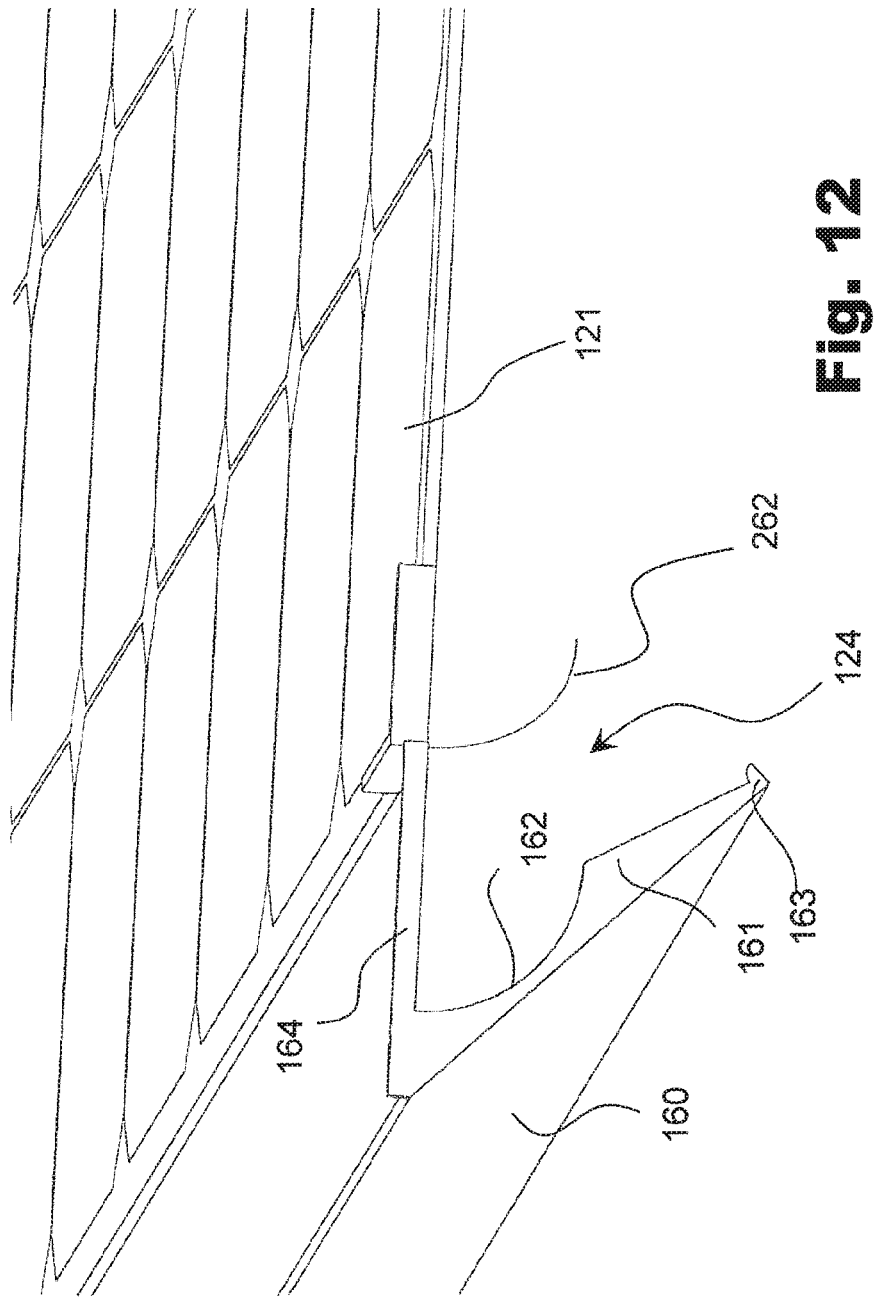
FIG. 12 shows an enlarged view of a corner of the solar panel platform of FIG. 9.

FIG. 12 shows an enlarged view of a corner of the solar panel platform 120 of FIG. 8 or 9 in the extended position. It is a schematical view in the sense that the rod 164 is provided at the level of the photovoltaic panel 121, wherein the connection to the drive has to be effected within the tray of the substructure 122, here shown with the single line of its curved outer surface 262. It can be seen that the passage 124 allows light and water to pass from the upper side of the platform 120 to its underside. The curvature of the curved profile section 162 can be chosen to direct the incoming light to the ground or onto the also reflecting curved outer surface 262 of the substructure 122 to be reflected again towards the ground or on the plane reflecting profile 161. Direct incoming light from above is reflected from the plane reflecting profile 161 towards the reflecting border surface 256 of the central ridge 123.

Figure 13:
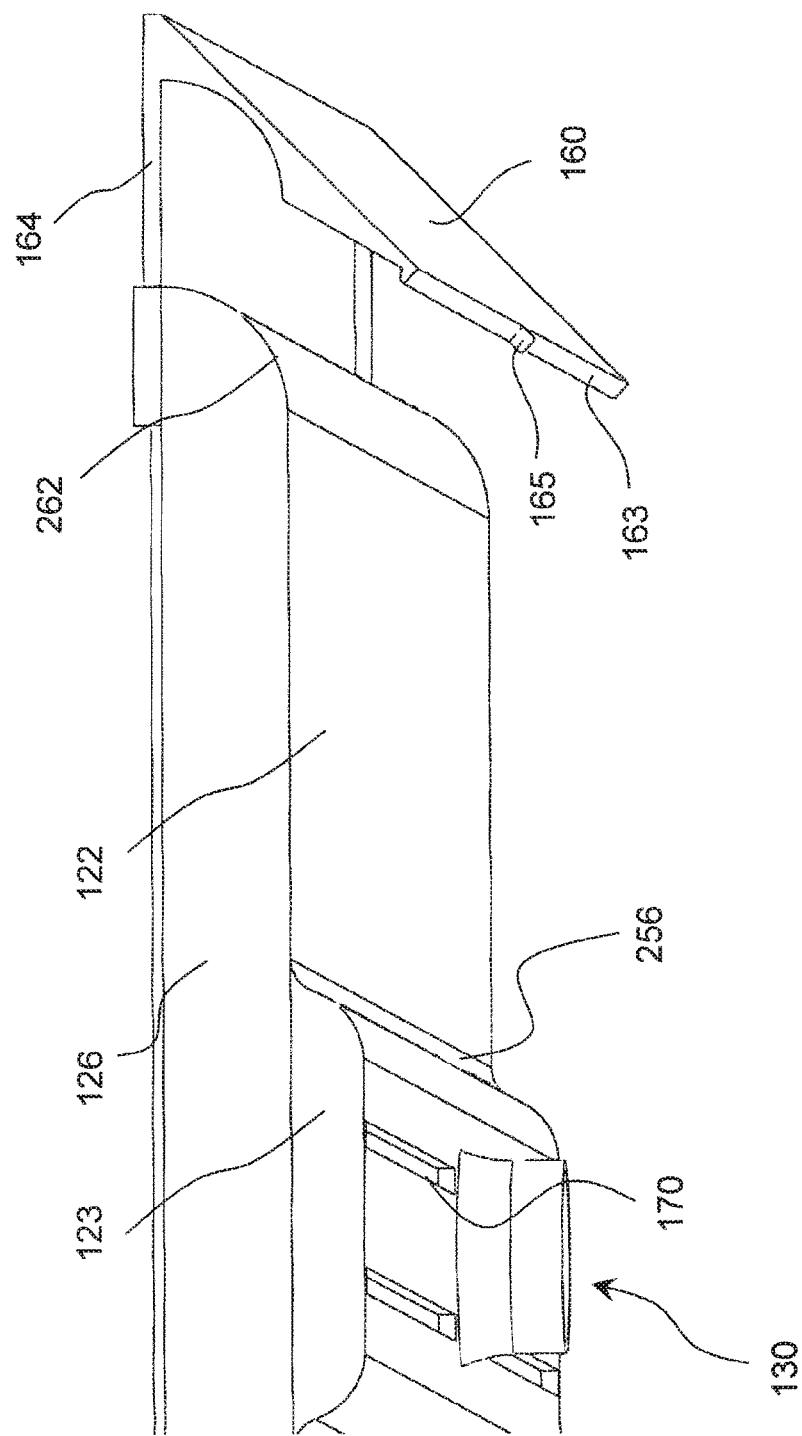
FIG. 13 shows an enlarged view of the underside of the solar panel platform of FIG. 9.

FIG. 13 shows an enlarged view of the underside of the solar panel platform 120 of FIG. 9. Reference numeral 165 designates an outlet of the lower gutter edge 163 of profile 160. Liquid collected on the upper lip, i.e. raised part, of the edge 163 is guided through outlet 165 to the central connection where a flexible line 62 can be connected.

LIST OF REFERENCE SIGNS

| | |
|---|---|
| 10 | solar panel assembly |
| 11 | oleophilic layer |
| 12 | clear polymer or glass |
| 20 | platform |
| 21 | upper surface |
| 22 | lower surface, underside |
| 23 | attachment point |
| 24 | edge of the platform |
| 30 | stand |
| 31 | ground |
| 40 | universal joint |
| 50 | integrated optical elements at the edge |
| 51 | reflecting surface |
| 52 | light gathering lens |
| 53 | arcuate upper entry surface |
| 54 | lower perpendicular outgoing surface |
| 55 | optical element at the centre |
| 56 | reflecting surface |
| 57 | triangular reflecting profile |
| 58 | trapezoid profile |
| 60 | gutter wall |
| 61 | conduit line/borehole |
| 62 | flexible line |
| 63 | funnel attachment |
| 64 | upper line |
| 65 | line junction |
| 70 | light source, LED |
| 71 | light diffracting lens |
| 81 | electric line |
| 82 | external connection |
| 85 | agricultural line |
| 101 | incoming light beam |
| 102 | reflected beam |
| 103 | light beam directed to the ground |
| 104 | main reflecting surface |
| 105 | adjacent acute angled surface |
| 106 | intermediate reflected beam |
| 109 | detail view of a grated reflecting surface |
| 120 | solar panel platform |
| 121 | solar panel |
| 122 | substructure |
| 123 | central functional ridge |
| 124 | passage |
| 125 | lower surface of substructure |
| 126 | edge of substructure |
| 127 | bottom surface |
| 128 | reinforcing web |
| 130 | opening |
| 156 | grated reflecting surface |
| 160 | extendable gutter and reflective profile |
| 161 | lower plane profile |
| 162 | upper curved section of the profile |

LIST OF REFERENCE SIGNS

| | |
|---|---|
| 163 | lower edge of the profile |
| 164 | side rod, connection web |
| 165 | outlet |
| 170 | LED stripe |
| 256 | reflecting border surface |
| 262 | substructure curved section |
| 403 | arm |
| 404 | first mechanism |
| 406 | first motor |
| 410 | horizontal axis |
| 414 | second mechanism |
| 416 | second motor |
| 420 | vertical axis |

The invention claimed is:

1. A solar panel assembly (10) comprises a stand (30) to be anchored on or in the ground (31), a solar panel platform (20, 120) oriented to the skies and one or more directional mechanisms (40; 404, 414) connecting an upper free end of the stand (30) with the solar panel platform (20, 120), allowing a solar panel (121) on the platform (20, 120) to be directed in at least one favorable orientation towards the sun, characterized in that one or more optical elements (50; 161, 162) are provided at all or at a majority of portions of the edges (24) of the platform (20, 120) around the solar panel directing light under the platform (20, 120) or towards its underside (22), and then to the ground (31) under or near the solar panel assembly (10), wherein one or more of the optical elements (161, 162) are mounted on an inner side of a profile (160), wherein the profile (160) is connected via at least one web (164) to the solar panel platform (120), wherein at least one web (164) is connected with a drive within the platform (120), wherein the connection of at least one web (164) is adapted to extend the profile (160) from the platform (120) creating a passage (124) between the profile (160) and the platform (120).

2. The solar panel assembly (10) according to claim 1, wherein an outer surface (262) of the body of a platform substructure (122), on which the solar panel (121) is mounted, facing the inner surface of the profile (160) is complementary to this inner surface so that the inner surface of the profile (160) is mainly in direct two-dimensional contact with this outer surface (262) when the profile (160) is fully retracted.

3. The solar panel assembly (10) according to claim 1, wherein an upper section (162) of the profile (160) is curved, covering an angle of 60 to 90 degrees, and wherein a lower section of the profile (160) is a plane profile (161) having an angle between 30 and 60 degrees to the plane of the platform surface, optionally having a raised gutter edge (163) at its lower free edge.

4. The solar panel assembly (10) according to claim 1, characterized in that a plurality of light sources (70, 170) are provided at the underside (22) or at the substructure (122) of the solar panel platform (20, 120) directed towards the ground (31).

5. The solar panel assembly (10) according to claim 4, wherein the light sources (70, 170) are positioned along the surrounding edges (24) of the solar panel platform (20) or are positioned in a predetermined pattern on the underside (22) or substructure (122) of the solar panel platform (20, 120) in the centre of the underside (22) or of the substructure (122).

6. The solar panel assembly (10) according to claim 4, wherein the light sources are LEDs (70, 170) tuneable to a predetermined grow light wavelength adjusted by a control unit or pretuned wavelengths.

7. The solar panel assembly (10) according to claim 1, wherein the solar panel platform (20, 120) has at least one exterior edge (24) comprising at least one rainwater gutter (60, 163) at the at least one edge of the solar panel platform (20, 120) and at least one distribution element (62, 64), wherein the distribution element (62, 64) comprises one end (63) being connected with the at least one rainwater gutter (60, 163) and the other end being adapted to deliver rainwater collected in the gutter (60, 163) to a receiver inside the stand (30) or to the ground (31) below.

8. The solar panel assembly (10) according to claim 7, wherein the rainwater gutter (60, 163) is connected to a conduit (61) passing the thickness of the solar panel platform (20) connected to a flexible conduit (62) as distribution element.

9. The solar panel assembly (10) according to claim 1, further comprising a battery which can be charged by the solar panel and driving the directional mechanisms (40; 404, 414).

10. Array of solar panel assemblies (10) comprising a plurality of solar panel assemblies (10) according to claim 1, positioned in rows, wherein opposing edges (24) of solar panel assemblies (10) of adjacent rows are provided at a minimum distance less than 80% of the width of the adjacent solar panel assemblies (10) creating agricultural pathways (85) between the rows of stands (30) under the solar panel platforms (20, 120).

11. Array of solar panel assemblies (10) according to claim 10, wherein the minimum distance between opposing edges (24) of solar panel assemblies (10) of adjacent rows is less than a percentage of the width of the adjacent solar panel assemblies (10) taken from the group 60%, 40%, 20%, 10% or 5%.

12. Array of solar panel assemblies (10) according to claim 10, wherein the minimum distance as predetermined between rows also applies to the distance between adjacent columns of the array.

13. Array of solar panel assemblies (10) according to claim 10, wherein electrical and/or communication lines (81) are interconnecting all solar panel assemblies (10) and/or electrical and/or communication lines (82) are connecting the array with an external system.

14. Array of solar panel assemblies (10) according to claim 10, wherein each solar panel assembly (10) comprises a wireless communication means wherein each communication means is configured to be an access point of a distributed computer network.

* * * * *